US012689166B2

(12) United States Patent
Hsiao

(10) Patent No.: US 12,689,166 B2
(45) Date of Patent: Jul. 21, 2026

(54) POWER ADAPTER

(71) Applicant: BIZLINK INTERNATIONAL CORP., New Taipei City (TW)

(72) Inventor: Su Ken Hsiao, New Taipei City (TW)

(73) Assignee: BIZLINK INTERNATIONAL CORP., New Taipei City (TW)

( * ) Notice: Subject to any disclaimer, the term of this patent is extended or adjusted under 35 U.S.C. 154(b) by 339 days.

(21) Appl. No.: 18/395,477

(22) Filed: Dec. 23, 2023

(65) Prior Publication Data

US 2024/0222920 A1 Jul. 4, 2024

(30) Foreign Application Priority Data

Dec. 30, 2022 (TW) .................................. 111151007

(51) Int. Cl.
*H01R 31/06* (2006.01)
*H01R 13/04* (2006.01)
*H01R 13/10* (2006.01)

(52) U.S. Cl.
CPC ............. *H01R 31/06* (2013.01); *H01R 13/04* (2013.01); *H01R 13/10* (2013.01)

(58) Field of Classification Search
CPC ........ H01R 31/06; H01R 13/04; H01R 13/10; H01R 13/703; H01R 25/006; H01R 24/70
See application file for complete search history.

(56) References Cited

U.S. PATENT DOCUMENTS 10,985,490 B1 * 4/2021 Ding ...................... H01R 24/76
2012/0142208 A1 * 6/2012 Peng ...................... H01R 31/06 439/345
2024/0222920 A1 * 7/2024 Hsiao ..................... H01R 13/10
2025/0286317 A1 * 9/2025 Zhang .............. H01R 13/62966

FOREIGN PATENT DOCUMENTS

CN 103944012 A * 7/2014
CN 208352657 U 1/2019
TW I767658 B 6/2022

* cited by examiner

*Primary Examiner* — Abdullah A Riyami
*Assistant Examiner* — Nader J Alhawamdeh
(74) *Attorney, Agent, or Firm* — CKC & Partners Co., LLC

(57) ABSTRACT

A power adapter includes a conductive sheet, a first electrode group, and a second electrode group. The first electrode group includes a first pin and a first elastic arm. The first elastic arm is continuously electrically connected to the first pin. The second electrode group includes a second pin and a second elastic arm. The second elastic arm is continuously electrically connected to the second pin. The first pin and at least a part of the second elastic arm are located on one side of the conductive sheet. The first elastic arm and at least a part of the second pin are located on another side of the conductive sheet. The first elastic arm and the second elastic arm are configured to deform under force to contact the conductive sheet.

14 Claims, 5 Drawing Sheets

POWER ADAPTER

CROSS-REFERENCE TO RELATED APPLICATION

This application claims priority to Taiwan Application Serial Number 111151007, filed Dec. 30, 2022, which is herein incorporated by reference.

BACKGROUND

Technical Field

The present disclosure relates to a power adapter, and more particularly, to a power adapter that can combine power from multiple plugs.

Description of Related Art

Recently, some electronic devices have increased demand for power, so they may need to be powered by two plugs. Therefore, an adapter is needed to collect the power from the two plugs and provide power. At the same time, in order to reduce the possibility of electric shock and reduce the possibility of damage to the machine due to insufficient voltage and current, it is known that there are design requirements for the adapter to be powered only when both plugs are inserted. In order to meet the stringent requirements of both of the above, it has to adopt a more complex design, as shown in Taiwan Patent No. 1767658B, for example.

Accordingly, how to provide a power adapter that is simple in design and can effectively combine the power of multiple plugs and can only be powered on when both plugs are inserted is one of the main problems to be solved by the present disclosure.

SUMMARY

An aspect of the disclosure is to provide a simple and safe bus-type power adapter.

According to an embodiment of the disclosure, a power adapter includes a conductive sheet, a first electrode group, and a second electrode group. The first electrode group includes a first pin and a first elastic arm. The first elastic arm is continuously electrically connected to the first pin. The second electrode group includes a second pin and a second elastic arm. The second elastic arm is continuously electrically connected to the second pin. The first pin and at least a part of the second elastic arm are located on one side of the conductive sheet. The first elastic arm and at least a part of the second pin are located on another side of the conductive sheet. The first elastic arm and the second elastic arm are configured to deform under force to contact the conductive sheet.

In one or more embodiments of the present disclosure, one of the suspension members and one of the actuation members on one of the disposing areas are arranged in a normal direction of the mounting surface.

In one or more embodiments of the present disclosure, the power adapter further includes an outer housing. The outer housing includes a first slot and a second slot. The first pin passes through the outer housing and enters the first slot. The second pin passes through the outer housing and enters the second slot.

In one or more embodiments of the present disclosure, the first elastic arm is connected with a first protruding structure.

The second elastic arm is connected with a second protruding structure. The first protruding structure is at least partially located within the second slot. The second protruding structure is at least partially located within the first slot.

In one or more embodiments of the present disclosure, the first elastic arm and the second elastic arm are electrical conductors. The first protruding structure and the second protruding structure are electrical insulators.

In one or more embodiments of the present disclosure, the first elastic arm and the second elastic arm are entirely located inside the outer housing and are not exposed from the first slot or the second slot.

In one or more embodiments of the present disclosure, the outer housing includes an upper housing and a lower housing connected to each other. An inner surface of the lower housing is provided with a first abutting arm and a second abutting arm. The first abutting arm is provided with the first protruding structure. The second abutting arm is provided with the second protruding structure.

In one or more embodiments of the present disclosure, the first protruding structure has a first inclined surface substantially facing an opening of the second slot. The second protruding structure has a second inclined surface substantially facing an opening of the first slot.

In one or more embodiments of the present disclosure, the first electrode group and the second electrode group are U-shaped.

In one or more embodiments of the present disclosure, wherein the conductive sheet is T-shaped.

According to an embodiment of the disclosure, a power adapter includes an outer housing, a first pin, a second pin, a first elastic arm module, a second elastic arm module, and a conductive sheet. The outer housing includes a first slot and a second slot. The first pin is fixedly disposed in the first slot. The second pin is fixedly disposed in the second slot. At least a part of the first elastic arm module is continuously electrically connected to the first pin. At least a part of the second elastic arm module is continuously electrically connected to the second pin. When used, the power adapter has a first state and a second state. In the first state, only one of the first elastic arm module and the second elastic arm module is pressed into the outer housing, so that one of the first pin and the second pin is not electrically connected to the conductive sheet. In the second state, the first elastic arm module and the second elastic arm module are both pressed into the outer housing, so that the first pin and the second pin are electrically connected to the conductive sheet.

In one or more embodiments of the present disclosure, the first elastic arm module includes a first elastic arm that is conductive. The first elastic arm is continuously electrically connected to the first pin. The second elastic arm module includes a second elastic arm which is conductive. The second elastic arm is continuously electrically connected to the second pin.

In one or more embodiments of the present disclosure, the outer housing includes an upper housing and a lower housing connected to each other. The upper housing is provided with the first slot and the second slot. The first elastic arm and the second elastic arm are entirely located inside the outer housing in the first state or the second state and do not pass into the first slot or the second slot.

In one or more embodiments of the present disclosure, the first elastic arm module further includes a first abutting arm that is electrically insulating. The first abutting arm passes into the second slot. The second elastic arm module further includes a second abutting arm that is electrically insulating. The second abutting arm passes into the first slot.

In one or more embodiments of the present disclosure, the lower housing, the first abutting arm, and the second abutting arm are one-pieced formed.

In one or more embodiments of the present disclosure, each of the first elastic arm and the second elastic arm is provided with a horizontal extension portion. The conductive sheet is suspended above the horizontal extension portions of the first elastic arm and the second elastic arm.

Accordingly, in the power adapter of the present disclosure, when only a first plug is inserted into the first slot but a second plug is not inserted into the second slot, although the first plug can be electrically connected to the first pin, the first elastic arm is not pressed by the second plug to be electrically connected to a power output module. Therefore, the power of the first plug still cannot be transmitted to the power output module, and vice versa. Only when the first plug and the second plug are inserted into the first slot and the second slot respectively, can the power output module be connected to the first plug and the second plug at the same time. In this way, the safety of the power adapter of the present disclosure can be effectively improved.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
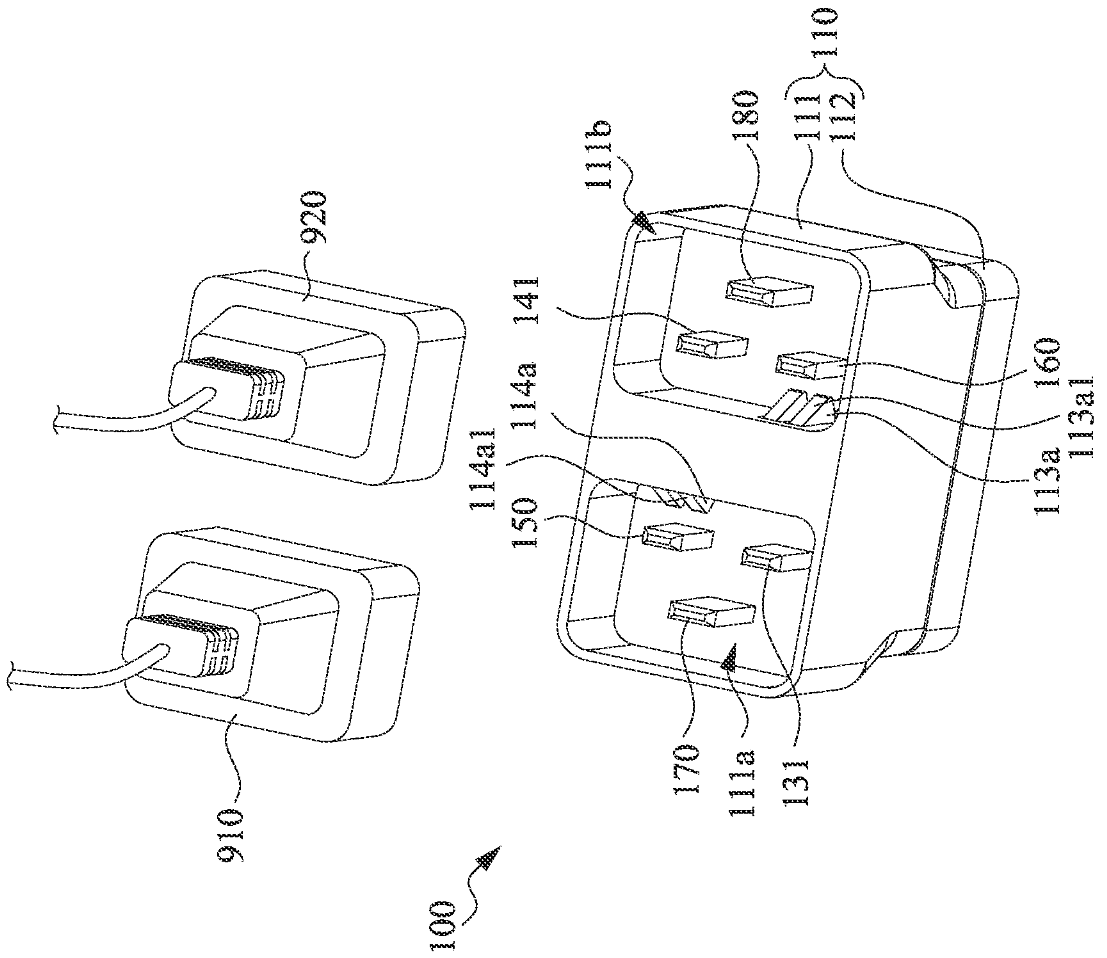
FIG. 1 is a perspective view of a power adapter, a first plug, and a second plug according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 2:
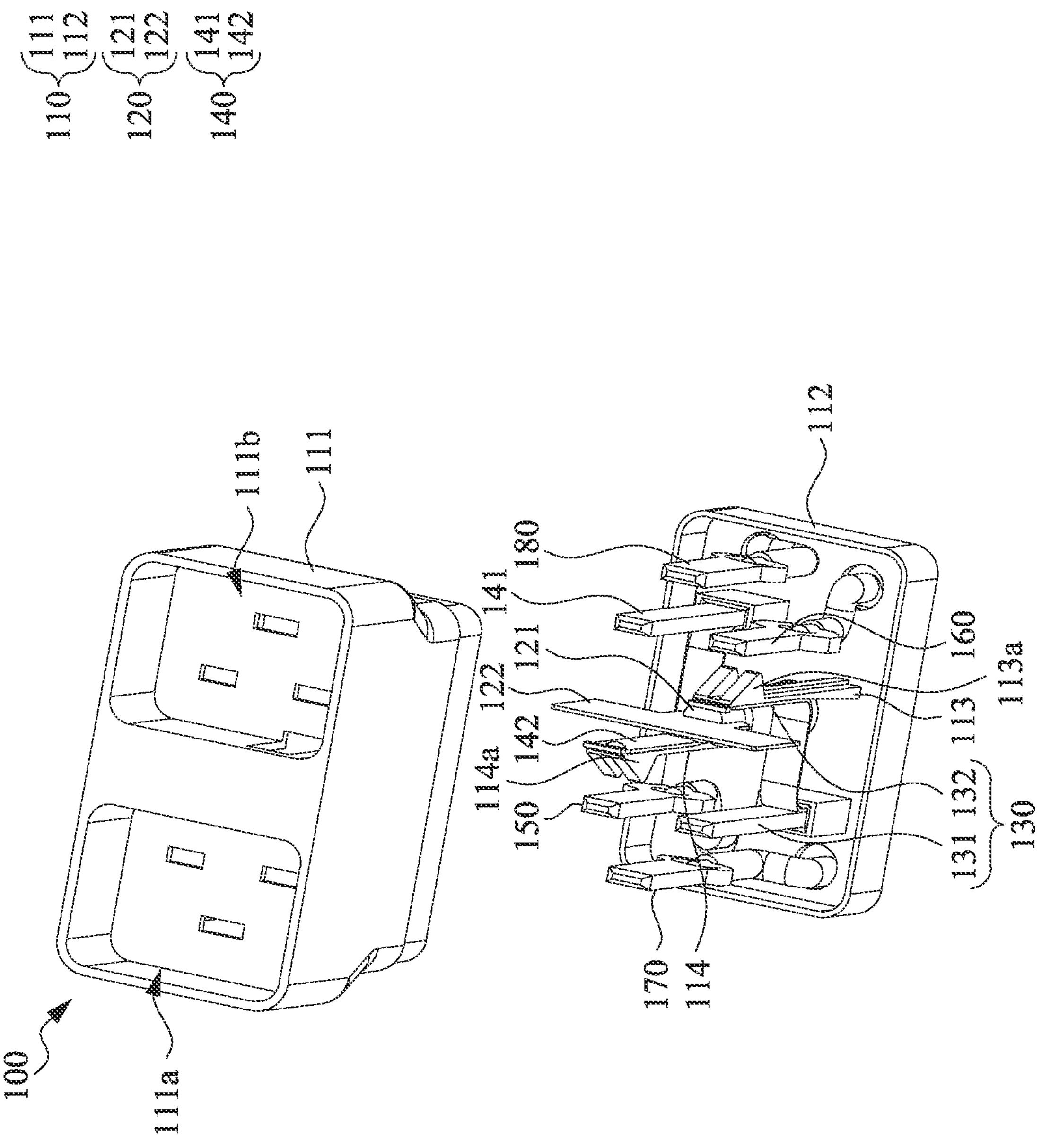
FIG. 2 is an exploded view of the power adapter in FIG. 1.
Figure 3:
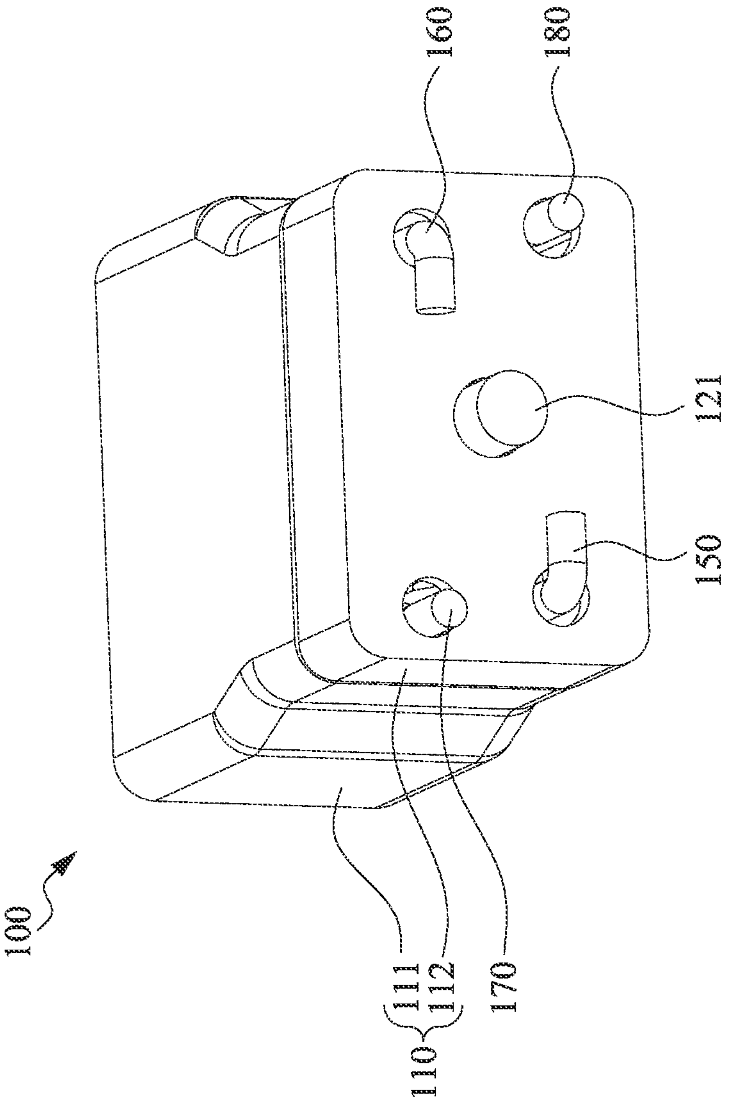
FIG. 3 is another perspective view of the power adapter in FIG. 1.

Reference is made to FIG. 1, FIG. 2, and FIG. 3. FIG. 1 is a perspective view of a power adapter 100, a first plug 910, and a second plug 920 according to an embodiment of the present disclosure. FIG. 2 is an exploded view of the power adapter 100 in FIG. 1. FIG. 3 is another perspective view of the power adapter 100 in FIG. 1.

As shown in FIG. 1 to FIG. 3, in the present disclosure, the power adapter 100 includes an outer housing 110, a power output module 120, a first electrode group 130, a second electrode group 140, a first neutral pin group 150, a second neutral pin group 160, a first grounding pin group 170, and a second grounding pin group 180.

The outer housing 110 includes an upper housing 111 and a lower housing 112. The upper housing 111 is detachably fixed to the lower housing 112.

As shown in FIG. 2, the upper housing 111 has a first slot 111*a* and a second slot 111*b*. The first slot 111*a* and the second slot 111*b* are respectively configured to be inserted by two plugs (e.g., the first plug 910 and a second plug 920). Each slot is provided with a plurality of slot through holes for each pin to pass into, and lateral through holes for a first abutting arm 113 and a second abutting arm 114 to pass into.

An inner surface of the lower housing 112 is provided with a plurality of hollow bosses, a first abutting arm that is electrically insulating, a second abutting arm that is electrically insulating, and a plurality of cable holes. The cable holes run through the inner and outer sides of the lower housing 112. The hollow bosses include a blind hole.

One end of the first abutting arm 113 and the second abutting arm 114 extend upward from the inner surface of the lower housing 112, and can be elastically deformed and swing due to force. In this example, the first abutting arm 113 and the lower housing 112 are one-pieced formed. In another example, the first abutting arm 113 and the lower housing 112 are independent components. The second abutting arm 114 is designed to correspond to the first abutting arm 113.

As shown in FIG. 3, the power output module 120 includes a live wire 121 and a conductive sheet 122 welded and connected to the live wire 121. The conductive sheet 122 is a T-shaped metal sheet facing the horizontal direction, and the root of the conductive sheet 122 is welded and fixed to the live wire 121.

The first electrode group 130 includes a first pin 131 and a first elastic arm 132. The first elastic arm 132 is an electrical conductor (i.e., conductive), such as a flexible metal sheet. The roots of the first pin 131 and the first elastic arm 132 are fixed to each other so that they are continuously electrically connected to each other.

The second electrode group 140 includes a second pin 141 and a second elastic arm 142. The second elastic arm 142 is an electrical conductor (i.e., conductive), such as a flexible metal sheet. The connection relationship between the second elastic arm 142 and the second pin 141 is the same as that of the first elastic arm 132 and the first pin 131.

After the assembly is completed, the first pin 131 and at least part of the second elastic arm 142 are located on one side of the conductive sheet 122 (for example, the left side of the conductive sheet 122 in FIG. 2). The first elastic arm 132 and at least a part of the second pin 141 are located on another side of the conductive sheet 122 (for example, the right side of the conductive sheet 122 in FIG. 2). The first elastic arm 132 and the second elastic arm 142 are configured to deform under force to contact the conductive sheet 122. In addition, in this example, the first elastic arm 132 and the second elastic arm 142 are entirely located inside the outer housing 110 and are not exposed from the first slot 111*a* or the second slot 111*b*.

The cable parts of the first neutral pin group 150, the second neutral pin group 160, the first grounding pin group 170, and the second grounding pin group 180 respectively pass through the cable holes and enter the interior of the outer housing 110 to be electrically connected to the pin portions thereof. As mentioned above, the conductive sheet 122 is coupled to the live wire 121. During use, the conductive sheet 122 is entirely located inside the outer housing 110. In addition, at least one part of each of various pins such as the first pin 131 and the second pin 141 will pass into the first slot 111*a* or the second slot from the respective slot through hole of the first slot 111*a* or the second slot 111*b*.

In addition, the first elastic arm 132 of the first electrode group 130 extends horizontally from the hollow boss to the right, passes from the bottom of the conductive sheet 122 from the left side to the right side of the conductive sheet 122, and then is folded upward to connect and abut with the first abutting arm 113. The second elastic arm 142 is designed corresponding to the first elastic arm 132. That is, each of the first elastic arm 132 and the second elastic arm 142 is provided with a horizontal extension portion, and the conductive sheet 122 is suspended above the horizontal extension portions of the first elastic arm 132 and the second elastic arm 142 at the same time.

When used, the first abutting arm 113 and the second abutting arm 114 will enter or leave the first slot 111*a* and the second slot 111*b* depending on the compressed state.

In addition, the combination of the first elastic arm 132 and the first abutting arm 113 can be regarded as a first elastic arm module. The second elastic arm 142 of the second electrode group 140 abuts against the second abutting arm 114, and the combination of the second elastic arm 142 and the second abutting arm 114 can be regarded as a second elastic arm module.

As shown in FIG. 1 and FIG. 2, in the present disclosure, the first abutting arm 113 is provided with a first protruding structure 113*a*. The second abutting arm 114 is provided with a second protruding structure 114*a*. As shown in FIG. 1, only the first protruding structure 113*a* of the first abutting arm 113 and the second protruding structure 114*a* of the second abutting arm 114 pass into the second slot 111*b* and the first slot 111*a* respectively through the lateral through holes. At the same time, when used, the first elastic arm 132 and the second elastic arm 142 are entirely located in the outer housing 110 and do not enter the first slot 111*a* or the second slot 111*b*.

In some embodiments, the lower housing 112, the first abutting arm 113, and the second abutting arm 114 are one-pieced formed. That is, the lower housing 112, the first abutting arm 113, and the second abutting arm 114 are different portions of a unitary structure, but the present disclosure is not limited thereto.

In some other embodiments, the first protruding structure 113*a* of the first abutting arm 113 can be directly fixed to the surface of the first elastic arm 132 and the remaining portion of the first abutting arm 113 can be omitted. Similarly, the parts of the second abutting arm 114 except the second protruding structure 114*a* can be omitted, that is, only the second protruding structure 114*a* is fixed on the second elastic arm 142.

In the present embodiments, the power adapter 100 is in an unused state when leaving the factory. As shown in FIG. 1, the first plug 910 and the second plug 920 are not inserted into the power adapter 100, and the first elastic arm module and the second elastic arm module are not pressed.

Figure 4:
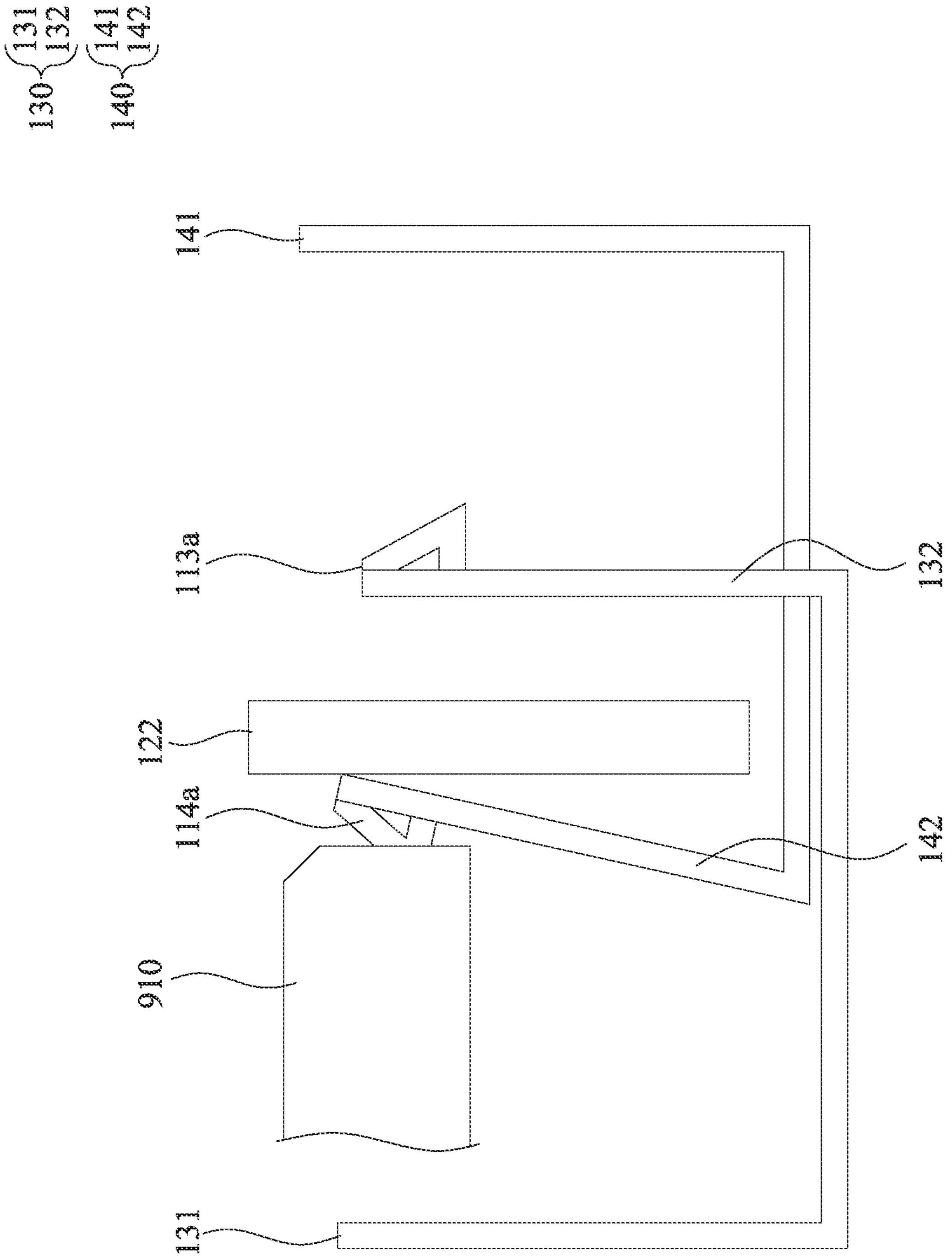
FIG. 4 is a schematic diagram showing some components of the power adapter in a first state.
Figure 5:
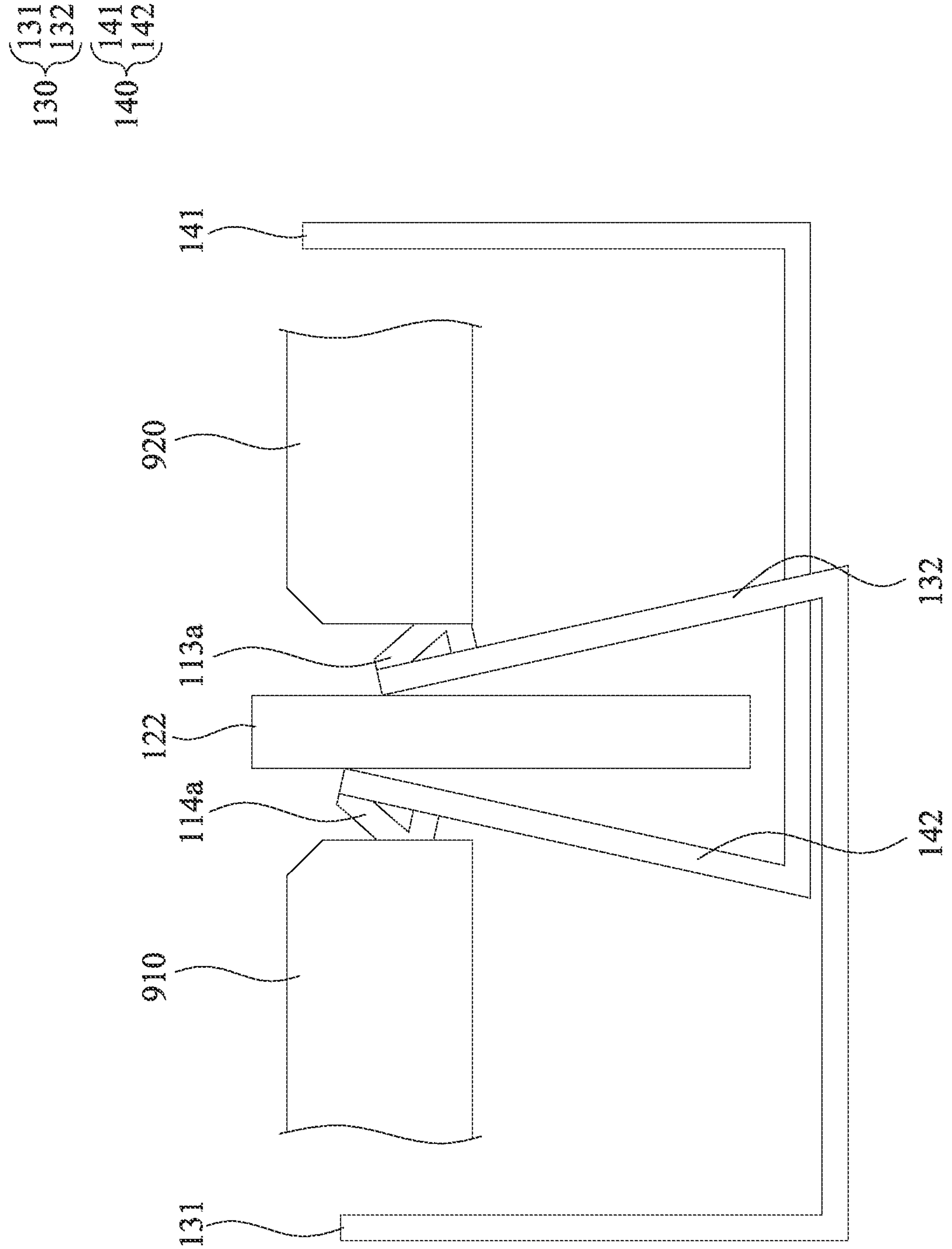
FIG. 5 is a schematic diagram showing some components of the power adapter in a second state.

When used, the power adapter 100 may have a first state and a second state. Reference is made to FIG. 4 and FIG. 5. FIG. 4 is a schematic diagram showing some components of the power adapter 100 in a first state. FIG. 5 is a schematic diagram showing some components of the power adapter 100 in a second state. In FIGS. 4 and 5, only the conductive sheet 122, the first electrode group 130, the second electrode group 140, the first protruding structure 113*a*, and the second protruding structure 114*a* of the power adapter 100 are shown to clearly show the appearance of these components in different states. In the first state, as shown in FIG. 4, the second plug 920 is not inserted into the second slot 111*b*. The first plug 910 is inserted into the first slot 111*a* to supply power to the first pin 131 and simultaneously presses the second elastic arm module, so that the second pin 141 is electrically connected to the power output module 120. However, since the second plug 920 is not inserted into the second slot 111*b*, the first protruding structure 113*a* of the first elastic arm module exposed from the second slot 111*b* is not pressed, so that the first elastic arm 132 cannot contact the conductive sheet 122. Therefore, the first plug 910 still cannot supply power to the power output module 120 through the first electrode group 130. In other words, the power output module 120 and the first plug 910 are in a disconnected state.

In contrast, although not shown in the figure, when the first plug 910 is not inserted into the first slot 111*a* and the second plug 920 is inserted into the second slot 111*b* to power the second pin 141, the second plug 920 will simultaneously press the first elastic arm module, so as to make the first pin 131 be electrically connected to the power output module 120. However, since the first plug 910 is not inserted into the first slot 111*a*, the second protruding structure 114*a* of the second elastic arm module exposed from the first slot 111*a* is not pressed, so that the second elastic arm 142 cannot contact the conductive sheet 122. Therefore, the second plug 920 still cannot supply power to the power output module 120 through the second electrode group 140. In other words, the power output module 120 and the second plug 920 are in a disconnected state.

In the second state, as shown in FIG. 5, the first plug 910 and the second plug 920 are inserted into the first slot 111*a* and the second slot 111*b* respectively and press the second elastic arm module and the first elastic arm module respectively, so as to make the first pin 131 and the second pin 141 contact the conductive sheet 122 to be electrically connected to the power output module 120. In this way, the first plug 910 and the second plug 920 can provide power to the power output module 120 through the first electrode group 130 and the second electrode group 140 respectively. In other words, the power output module 120 can be in a connected state with the first plug 910 and the second plug 920 at the same time.

From the above configurations, it can be seen that the power adapter 100 of the present embodiment can be powered by the first plug 910 and the second plug 920 at the same time to obtain greater power. Furthermore, a connected state can be formed with the first plug 910 and the second plug 920 only when the first plug 910 and the second plug 920 are plugged in at the same time, so the safety can be effectively improved.

In some embodiments, as shown in FIG. 1, the first protruding structure 113*a* has a first inclined surface 113*a*1 substantially facing an opening of the second slot 111*b*. In this way, when the first plug 910 is inserted into the first slot 111*a*, the first plug 910 can slide smoothly relative to the first inclined surface 113*a*1, and can smoothly push the first protruding structure 113*a* to deform the first elastic arm 132 under force. Similarly, in some embodiments, as shown in FIG. 1, the second protruding structure 114*a* has a second inclined surface 114*a*1 substantially facing an opening of the first slot 111*a*. In this way, when the second plug 920 is inserted into the second slot 111*b*, the second plug 920 can slide smoothly relative to the second inclined surface 114*a*1, and can smoothly push the second protruding structure 114*a* to deform the second elastic arm 142 under force.

In some embodiments, as shown in FIGS. 4 and 5, the first electrode group 130 and the second electrode group 140 are U-shaped, but the present disclosure is not limited thereto.

According to the foregoing recitations of the embodiments of the disclosure, it can be seen that in the power adapter of the present disclosure, when only a first plug is inserted into the first slot but a second plug is not inserted into the second slot, although the first plug can be electrically connected to the first pin, the first elastic arm is not pressed by the second plug to be electrically connected to a power output module. Therefore, the power of the first plug still cannot be transmitted to the power output module, and vice versa. Only when the first plug and the second plug are inserted into the first slot and the second slot respectively, can the power output module be connected to the first plug and the second plug at the same time. In this way, the safety of the power adapter of the present disclosure can be effectively improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power adapter, comprising:

a conductive sheet;

a first electrode group comprising a first pin and a first elastic arm, the first elastic arm being continuously electrically connected to the first pin;

a second electrode group comprising a second pin and a second elastic arm, the second elastic arm being continuously electrically connected to the second pin; and an outer housing comprising a first slot and a second slot;

wherein the first pin and at least a part of the second elastic arm are located on one side of the conductive sheet, and the first elastic arm and at least a part of the second pin are located on another side of the conductive sheet, wherein the first elastic arm and the second elastic arm are configured to deform under force to contact the conductive sheet, wherein the first pin passes through the outer housing and enters the first slot, and wherein the second pin passes through the outer housing and enters the second slot.

2. The power adapter of claim 1, wherein:

the first elastic arm is connected with a first protruding structure, the second elastic arm is connected with a second protruding structure, the first protruding structure is at least partially located within the second slot, and the second protruding structure is at least partially located within the first slot.

3. The power adapter of claim 2, wherein the first elastic arm and the second elastic arm are electrical conductors, and the first protruding structure and the second protruding structure are electrical insulators.

4. The power adapter of claim 3, wherein the first elastic arm and the second elastic arm are entirely located inside the outer housing and are not exposed from the first slot or the second slot.

5. The power adapter of claim 4, wherein the outer housing comprises an upper housing and a lower housing connected to each other, an inner surface of the lower housing is provided with a first abutting arm and a second abutting arm, the first abutting arm is provided with the first protruding structure, and the second abutting arm is provided with the second protruding structure.

6. The power adapter of claim 2, wherein the first protruding structure has a first inclined surface substantially facing an opening of the second slot, and the second protruding structure has a second inclined surface substantially facing an opening of the first slot.

7. The power adapter of claim 1, wherein the first electrode group and the second electrode group are U-shaped.

8. The power adapter of claim 1, wherein the conductive sheet is T-shaped.

9. A power adapter, comprising:

an outer housing comprising a first slot and a second slot;

a first pin fixedly disposed in the first slot;

a second pin fixedly disposed in the second slot;

a first elastic arm module, at least a part of the first elastic arm module being continuously electrically connected to the first pin;

a second elastic arm module, at least a part of the second elastic arm module being continuously electrically connected to the second pin; and a conductive sheet;

wherein, when used, the power adapter has a first state and a second state;

in the first state, only one of the first elastic arm module and the second elastic arm module is pressed into the outer housing, so that one of the first pin and the second pin is not electrically connected to the conductive sheet, and in the second state, the first elastic arm module and the second elastic arm module are both pressed into the outer housing, so that the first pin and the second pin are electrically connected to the conductive sheet.

10. The power adapter of claim 9, wherein the first elastic arm module comprises a first elastic arm that is conductive, the first elastic arm is continuously electrically connected to the first pin, the second elastic arm module comprises a second elastic arm which is conductive, and the second elastic arm is continuously electrically connected to the second pin.

11. The power adapter of claim 10, wherein the outer housing comprises an upper housing and a lower housing connected to each other, the upper housing is provided with the first slot and the second slot, the first elastic arm and the second elastic arm are entirely located inside the outer housing in the first state or the second state and do not pass into the first slot or the second slot.

12. The power adapter of claim 10, wherein the first elastic arm module further comprises a first abutting arm that is electrically insulating, the first abutting arm passes into the second slot, the second elastic arm module further comprises a second abutting arm that is electrically insulating, and the second abutting arm passes into the first slot.

13. The power adapter of claim 12, wherein the lower housing, the first abutting arm, and the second abutting arm are one-pieced formed.

14. The power adapter of claim 10, wherein each of the first elastic arm and the second elastic arm is provided with a horizontal extension portion, and the conductive sheet is suspended above the horizontal extension portions of the first elastic arm and the second elastic arm.

* * * * *